Patented June 26, 1951

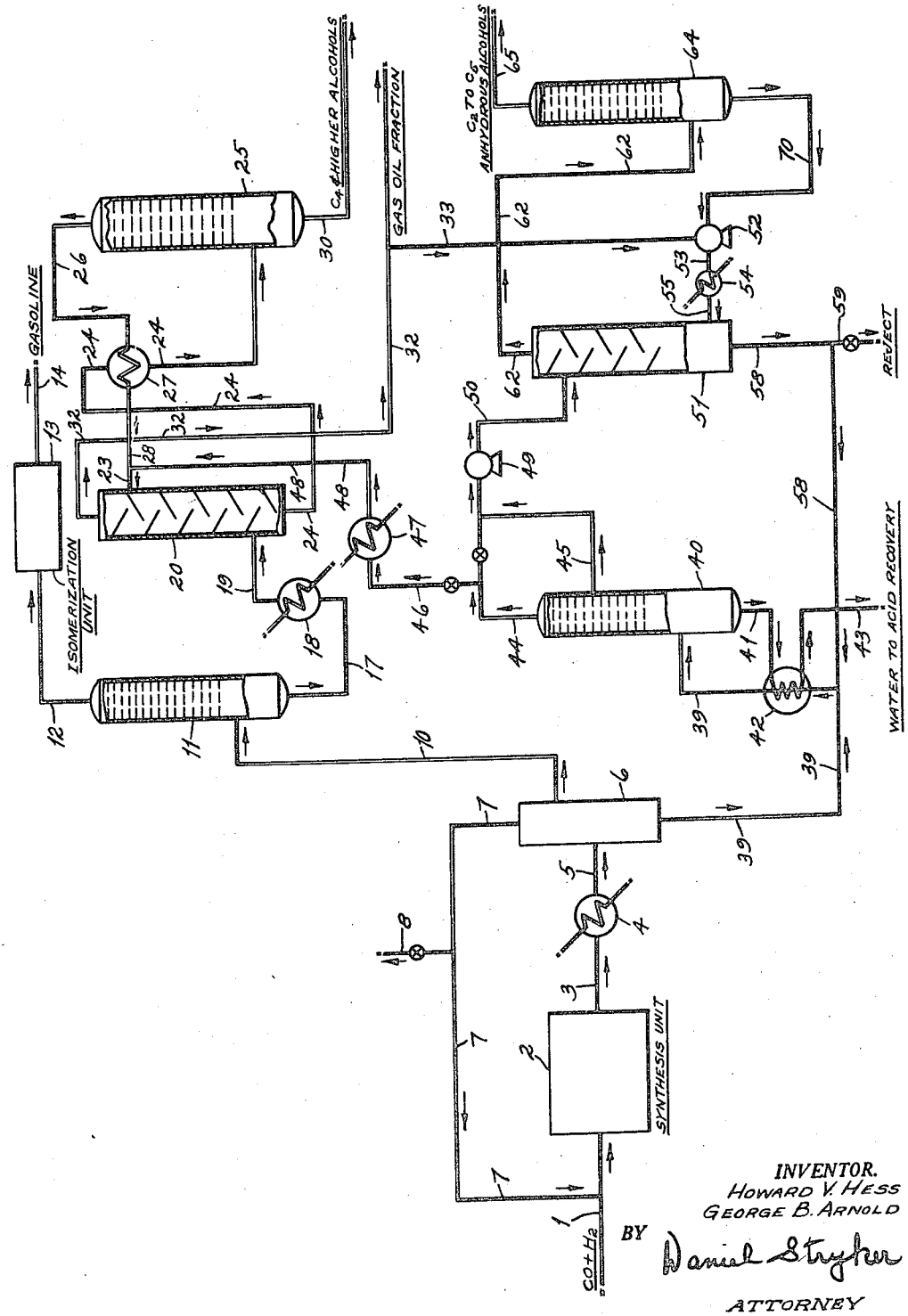

2,558,557

UNITED STATES PATENT OFFICE 2,558,557

EXTRACTION OF ALCOHOLS FROM THE F-T SYNTHESIS PRODUCT

Howard V. Hess, Beacon, and George B. Arnold, Glenham, N. Y., assignors to The Texas Company, New York, N. Y., a corporation of Delaware Application September 13, 1946, Serial No. 696,912

1 Claim. (Cl. 260—450)

This invention relates to the production of hydrocarbons and alcohols by the catalytic conversion of carbon monoxide and hydrogen and to the isolation of alcohols from their aqueous solution.

In accordance with the invention, synthesis gas comprising carbon monoxide and hydrogen is reacted in the presence of a catalyst to produce a synthesis product containing hydrocarbons, water and oxygen-containing compounds, the major portion of hydrocarbons and oxygen-containing compounds usually comprising compounds having from one to 20 carbon atoms per molecule. The synthesis reaction is advantageously carried out with a synthesis catalyst of the iron type at a temperature in the range of about 450 to 700° F. and at superatmospheric pressure, for example, about 150 to 300 pounds per square inch. Under these conditions, the synthesis product may comprise about two liquid volumes of water and one volume of normally liquid organic compounds. The oxygenated organic compounds comprising mainly alcohols may amount to from 5 to 20 volume per cent, approximately, of the total normally liquid product.

The reaction mixture is cooled to atmospheric temperature, i. e., about 60 to 100° F., with the accompanying condensation of the normally liquid components of the mixture. Ordinarily the mixture is also reduced to atmospheric pressure. The normally liquid components separate into two layers, one comprising a hydrocarbon-rich phase containing substantially all of the alcohols produced in the conversion which contain more than five carbon atoms per molecule in addition to a portion of the lower molecular weight alcohols, and particularly the $C_4$ and $C_5$ alcohols, and the other an aqueous phase which contains substantially all of the $C_2$ and $C_3$ alcohols produced in the conversion and some of the $C_4$ and $C_5$ alcohols. Small amounts of ketones and aldehydes may be present in both phases while practically all of the acids produced in the catalytic conversion are present in the water phase.

The uncondensed normally gaseous products of the synthesis reaction comprise unreacted carbon monoxide and hydrogen, carbon dioxide and low boiling organic compounds such as methane, ethane, low boiling oxygenated compounds, etc. At least a portion of this gas stream is recycled to the synthesis reaction zone for it is advantageous to recycle carbon dioxide as well as unreacted carbon monoxide and hydrogen.

The liquid hydrocarbon phase, containing substantially all of the alcoholic products of six or more carbon atoms per molecule, is subjected to solvent extraction with a selective solvent for the higher boiling alcohols dissolved therein. This selective solvent is substantially immiscible with the hydrocarbons at extraction temperature which lies in the range of 70 to 150° F. A preferred solvent for the extraction of $C_6$ and higher alcohols from the hydrocarbon phase is a mixture of the water azeotropes of $C_2$ and $C_3$ alcohols obtained from the aqueous phase. Other selective solvents, such as glycols which are immiscible with the hydrocarbon phase, may be used to effect the extraction of the $C_6$ and higher alcohols therefrom; methyl ethyl ketone, nitromethane and furfural, and water mixtures thereof, are examples of such selective solvents.

In a preferred modification of the invention, gasoline hydrocarbons boiling up to about 350° F. are separated from the hydrocarbon phase and alcohols are then extracted from the residual hydrocarbon fraction. This gasoline fraction will be substantially alcohol-free since the major portion of the alcohols boiling below 350° F. are in the water phase. This gasoline fraction may be isomerized so as to effect an improvement in its octane rating.

As a result of the extraction of either the total hydrocarbon phase, or the aforesaid residual hydrocarbon fraction, there is obtained a raffinate phase comprising essentially alcohol-free hydrocarbons. There is also obtained a solvent-rich extract phase containing substantially all of the $C_6$ and higher alcohols, plus a portion of $C_4$ and $C_5$ alcohols produced in the conversion. The alcohols are separated from the extract phase and may be separated into individual alcohols. The solvent is then recycled to the extraction unit.

The alcohol-free hydrocarbon fraction is subjected to further treatment depending upon its contemplated use. A portion of this alcohol-free hydrocarbon fraction may be used to extract the lower boiling alcohols from an alcohol-water azeotropic solution in a manner which will be indicated hereafter.

Water azeotropes of the $C_2$ to $C_5$ alcohols are distilled into two fractions from the water phase of the products of synthesis gas conversion, one fraction comprising the $C_2$ and $C_3$ alcohol azeotropes, the other comprising the $C_4$ and $C_5$ alcohol azeotropes. The residum from this distillation contains the acid products of conversion and may be treated so as to recover the acids therefrom.

A portion of this $C_2$ and $C_3$ alcohol azeotropic fraction is advantageously used to extract the higher boiling alcohols from the hydrocarbon phase of the synthesis products.

The remainder of the $C_2$—$C_3$ alcohol azeotropic fraction and the $C_4$—$C_5$ alcohol azeotropic fraction are combined and the aggregate is then subjected to liquid extraction with a selective solvent for the lower boiling alcohols dissolved therein. This selective solvent is substantially immiscible with water at extraction temperature. The preferred solvent for this extraction is the alcohol-free hydrocarbon fraction which has been obtained from the extraction of the hydrocarbon phase as previously outlined; if an alcohol-free hydrocarbon fraction of the products is used, the extraction is advantageously performed at elevated temperature, i. e., between about 300 and 400° F. and at elevated pressure, i. e., at about 150 to 300 pounds per square inch. This hydrocarbon fraction of the product comprises mainly aliphatic hydrocarbons of high olefin content and the effect of elevated temperature and pressure on the partition coefficient of alcohols between an aqueous phase and this hydrocarbon fraction is particularly advantageous.

As a result of the extraction, there is obtained a raffinate phase comprising mainly water which retains a small percentage of unextracted alcohols. Since this raffinate phase from the extraction of the alcohol-water azeotropes is not too large, it may be recycled to the distillation from which the alcohol-water azeotropes are obtained. There is also obtained from the extraction a solvent-rich extract phase which contains $C_2$ to $C_5$ alcohol products of conversion. The alcoholic products are separated from the solvent which latter is recycled to the extraction of the alcohol-water azeotropes.

The $C_2$ to $C_5$ alcohols may be further fractionated into individual anhydrous normal primary alcohols.

We have found that an aqueous azeotropic mixture of the $C_2$ and $C_3$ alcohols, distilled from the aqueous phase which is separated from the products of conversion at atmospheric temperature and pressure, is an excellent selective solvent for the extraction of higher boiling alcohols from the hydrocarbon phase of the conversion products. We have further found that the alcohol-free hydrocarbons, obtained as a raffinate from the extraction of the hydrocarbon phase, which is separated from the conversion products at atmospheric temperature and pressure, serve excellently as a selective solvent for extracting the lower boiling alcohols from an azeotropic mixture of the same.

In order to describe the invention in more detail, reference will now be made to the accompanying drawing.

As indicated in the drawing, carbon monoxide and hydrogen usually in the proportion of about two mols of hydrogen to one mol of carbon monoxide are obtained from a source not shown and passed through a conduit 1 to a conventional synthesis unit 2. In the conduit 1, the fresh charge of synthesis gas may be supplemented by the addition of normally gaseous products of the synthesis reaction.

In the synthesis unit 2, the reactants may be subjected to contact with a synthesis catalyst in the form of a fluidized mass of solid particles or powder. Preferably the catalyst contains iron as the hydrogenating metal although other synthesis catalysts using cobalt or nickel as hydrogenating metals may be used.

The synthesis reaction with an iron catalyst is usually carried out at a temperature in the range of about 500 to 700° F. and under a pressure of about 150 to 300 pounds per square inch. An iron catalyst which has proven particularly effective for synthesis of a mixture of hydrocarbons and oxygenated hydrocarbon derivatives contains about 96% iron, about 2 to 3% alumina and about 0.1 to 3% alkali metal oxides, such as potassium oxide.

An effluent stream comprising mainly reaction products leaves the synthesis unit 2 through a pipe 3 and is introduced into an exchanger 4. In the exchanger 4, the effluent stream is reduced to about atmospheric temperature, i. e., about 70 to 120° F. The product mixture may be expanded to about atmospheric pressure to effect further cooling. The total effluent then passes into a separator 6 through a pipe 5.

In the separator 6, there is effected separation of synthesis product into three phases: (1), a gas phase comprising mainly unreacted synthesis gas, carbon dioxide and normally gaseous hydrocarbon products, such as methane, ethane, propane and low boiling oxygenated compounds; (2), a hydrocarbon phase which is substantially free from low molecular weight fatty acids and which contains substantially all of the alcohols having six or more carbon atoms per molecule and a portion of the lower alcohols and which also contains small percentages of aldehydes and ketones; (3), a water phase containing substantially all of the remaining alcohols produced in the conversion in addition to small percentages of the lower boiling aldehydes and ketones and substantially all of the low molecular weight fatty acids produced in the conversion.

The gas phase is withdrawn from the separator 6 through a pipe 7 through which at least a portion of the gas phase may be recycled to the synthesis unit 2. The pipe 7 connects with the conduit 1 through which fresh synthesis feed is introduced into the synthesis unit 2. The non-recycled portion of the gas phase is discharged from the pipe 7 through a vent 8.

The hydrocarbon phase containing the higher alcohols leaves the separator 6 through a pipe 10 and is introduced into a fractionating column 11. In the fractionating column 11, the hydrocarbon phase is separated into two fractions, one a gasoline fraction distilling below about 350° F. and the other a gas oil fraction boiling above about 350° F.

The gasoline fraction is substantially free of alcoholic constituents since the major portion of the alcohols produced in the conversion which boil below about 350° F. is present in the aqueous phase. The gasoline fraction is taken off overhead through a pipe 12 and is passed to an isomerization unit 13 wherein it is subjected to intimate contact with a solid finely divided catalyst, such as alumina or bauxite, at a temperature of about 800° F. so as to effect isomerization of the olefinic constituents of the gasoline fraction. An octane improvement is realized through treatment of the gasoline fraction in this manner and gasoline of high octane rating is obtained from the unit 13 through a pipe 14.

The gas oil fraction is withdrawn from the fractionating column 11 through a pipe 17, is cooled to atmospheric temperature in the exchanger 18 and is then introduced into the extraction unit 20 through a pipe 19. In the extraction unit 20, the gas oil fraction is subjected to counter-current contact with a selective solvent for the dissolved alcohols present therein.

A mixture comprising a portion of the $C_2$ and $C_3$ alcohol azetropes obtained from column 40 to which reference will be made later, is advantageously employed for the extraction of the higher alcohols from the gas oil fraction. This counter-current extraction is conducted at temperatures in the range of 70 to 150° F. and with proportions of about ½ to 4 volumes of solvent per volume of gas oil fraction. Ordinarily the ratio of one volume of solvent to one volume of gas oil fraction is employed.

An azeotropic mixture of $C_2$ and $C_3$ alcohols is introduced into the upper portion of the extraction unit 20 through a pipe 23. The solubility of the $C_2$—$C_3$ azeotropic mixture in gas oil may be controlled by altering the amount of propyl alcohol azeotrope in the mixture since it contains about 28% water. As a result of the counter-current contact of the gas oil fraction with the solvent, a solvent-rich extract phase is continuously drawn off from the extraction unit 20 through a pipe 24 and is introduced into a fractionating still 25 after heat exchange in an exchanger 27. This extract phase contains $C_6$ and higher alcohols, and a portion of $C_4$ and $C_5$ alcohols dissolved in the solvent.

In the fractionating still 25, the solvent, the azeotropic mixture of $C_2$ and $C_3$ alcohols, which is more volatile than the extracted higher alcohols, is distilled through a pipe 26. After condensation in the exchanger 27, the solvent is returned through a pipe 28 to the pipe 23 through which it is reintroduced into the extraction unit 20.

The residual liquid, withdrawn from the fractionating still 25, through a pipe 30, comprises anhydrous $C_4$ and higher alcohols. This fraction may be separated into individual alcohols by further fractionation.

A raffinate phase consisting of substantially alcohol-free gas oil hydrocarbons is continuously withdrawn from the extraction unit 20 through a pipe 32. This gas oil fraction is then subjected to further treatment such as catalytic cracking, etc., depending upon its contemplated use. Advantageously, however, at least a portion of this gas oil fraction is used for the extraction of lower boiling alcohols from an azeotropic mixture of these alcohols with water and, to this end, is diverted from the pipe 32 through a pipe 33. A detailed description of the use of this gas oil fraction to extract alcohols from a water-alcohol azeotropic mixture is presented later.

Reference will now be made to the aqueous phase separated from the product of synthesis gas conversion at atmospheric temperature and pressure in the separator 6. It is continuously introduced through a pipe 39 into a fractionating column 40. This aqueous phase contains substantially all of the ethyl and propyl alcohol plus a substantial portion of butyl and amyl alcohols produced in the conversion. These alcohols are almost exclusively normal primary alcohols.

In the column 40, water azeotropes of the $C_2$ to $C_5$ alcohols are distilled from the water phase. As a result of this fractionation, there is obtained substantially alcohol-free water residue which is withdrawn from the column 40 through a pipe 41. This residual water solution is advantageously heat-exchanged in the exchanger 42 with the aqueous phase flowing into the column 40 through the pipe 39. After heat exchange, this aqueous solution which contains substantially all of the organic acids present in the synthesis products may be led through a pipe 43 to an acid-recovery plant or otherwise disposed of.

The water azeotropes of the $C_2$ to $C_5$ alcohols are distilled from the column 40 into two fractions; one comprises a mixture of the $C_2$ and $C_3$ alcohol azeotropes and is distilled through the pipe 44; the other comprises the $C_4$ and $C_5$ alcohol azeotropes and is distilled through a pipe 45.

The $C_2$ and $C_3$ azeotropic mixture is divided into two portions. One portion is diverted from the pipe 44 into a pipe 46, is condensed in an exchanger 47 and is then introduced into the extraction unit 20 through pipes 48 and 23. This mixture of the $C_2$ and $C_3$ azeotropes is a preferred solvent for the extraction of the higher alcohols from the gas oil fraction in the extraction unit 20.

The other portion of the $C_2$ and $C_3$ azeotropic mixture is introduced without reduction in temperature into a compressor 49 wherein it is raised to a pressure of 150–300 pounds per square inch. The mixture of $C_4$ and $C_5$ azeotropes is also introduced into the compressor 49 without reduction in temperature. The compression of the combined azeotropic mixtures results in liquefaction of substantially all of the distillate from the fractionating tower 40. The liquefied mixture is then introduced through a pipe 50 to an extraction unit 51, which is advantageously a vertical packed tower, maintained at a temperature lying between 200 and 350° F. and at a pressure lying in the range of 100–350 pounds per square inch.

In the extraction unit 51, the azeotropic mixture is subjected to counter-current contact with a stream of gas oil hydrocarbons at a temperature of about 200 to 300° F. and a pressure of about 150 to 300 pounds per square inch. As indicated previously, the gas oil hydrocarbons are advantageously obtained from the hydrocarbon phase of the products by the procedure which has been previously described. The solvent is employed in the proportions of about ½ to 4 volumes of solvent per volume of azeotropic mixture.

The gas oil hydrocarbons, from which the higher boiling alcohols have been substantially removed, are introduced through the pipe 33 into pump 52 wherein they are raised to a pressure lying in the range of 100 to 300 pounds per square inch. The gas oil fraction then proceeds through a pipe 53 into a heater 54 wherein its temperature is adjusted to a temperature lying in the range of 175 to 350° F. As a result of this treatment, the gas oil fraction is introduced into the extraction unit 51 through a pipe 55 at a temperature and pressure substantially equivalent to that prevailing therein.

As a result of the extraction of the alcohol-water azeotropes in the extraction unit 51 at elevated temperature and pressure, there are formed a raffinate phase comprising substantially alcohol-free water and a solvent-rich extract phase containing dissolved therein $C_2$ to $C_5$ alcohols. The raffinate phase is withdrawn from the extraction unit 51 through a pipe 58 and may be returned therethrough to the pipe 39 for recycling to the fractionating tower 40 since this aqueous raffinate still contains small percentages of alcohols dissolved therein. Alternatively, the raffinate may be rejected through the pipe 59.

The solvent-rich extract phase is continuously withdrawn from the extraction unit 51 through a pipe 62 and is introduced into a fractionating tower 64 after reducing to atmospheric pressure. Therein the dissolved alcohols may be separated from the gas oil hydrocarbon solvent by fractionation.

There is obtained from the tower 64 through the pipe 65 $C_2$ to $C_5$ alcohols in a substantially anhydrous state. This anhydrous alcohol fraction may be separated into individual alcohols by fractionation.

The residuum from the fractional distillation in the tower 64 comprising gas oil hydrocarbons is withdrawn from the tower 64 through a pipe 70 and while still at an elevated temperature, is introduced into the pump 52 for elevation to a pressure of 150 to 300 pounds per square inch. After elevation to a pressure in this range, the gas oil hydrocarbons are introduced through the pipe 55 into the extraction unit 51 at elevated temperature and pressure for the extraction of further quantities of alcohol from the alcohol-water azeotropes.

If the hydrocarbon fraction used to extract $C_2$ to $C_5$ alcohols from an aqueous azeotropic mixture of the same comprises both gasoline hydrocarbons boiling in the range of about 100° F. to 350° F. and gas oil hydrocarbons boiling above about 350° F., it will not be possible to separate the alcohols from the hydrocarbon-rich extract phase in which they are dissolved by distillation because of the similarity in boiling points of the alcohols and the gasoline hydrocarbons. It will be necessary to resort to a secondary extraction of the alcohols from the hydrocarbon phase with a solvent such as glycol which is immiscible in the hydrocarbons.

If the total hydrocarbon phase is subject to solvent extraction for the removal of dissolved alcohols therefrom, it is contemplated that the resulting alcohol-free hydrocarbon-rich raffinate may be fractionated into two fractions, one comprising the gasoline fraction boiling below about 375 to 400° F. and the other a gas oil fraction with an initial boiling point of about 375 to 400° F. The gas oil fraction is then employed to extract alcohols from the aqueous azeotropic mixture of $C_2$ to $C_5$ alcohols.

In the detailed description of the invention, a preferred modification is depicted in which an azeotropic mixture of $C_2$ and $C_3$ alcohols, separated from the aqueous phase of the products of conversion, is used for the extraction of higher boiling alcohols through the hydrocarbon phase and in which an alcohol-free hydrocarbon fraction of the products is used to extract the lower boiling alcohols from an aqueous azeotropic mixture of the same. It is noted at this point that the use of other solvents for the extraction of alcohols from both the hydrocarbon phase of the products and the aqueous azeotropic mixture is contemplated.

For the extraction of $C_6$ and higher alcohols from the hydrocarbon phase, it is contemplated that there may be used other selective solvents, among which may be listed glycols such as ethylene glycol, polyolefin glycols, polyhydric alcohols such as glycerol, amines such as ethanolamine and acids such as levulinic.

Alternative solvents for the liquid extraction of low boiling alcohols from the alcohol-water azeotropic mixture are aromatic hydrocarbons such as alkyl benzenes, heavy cracked naphthas, cycle gas oils, high molecular weight alcohols which are insoluble in water and which may be a mixture of the higher boiling alcoholic products of conversion, water insoluble ketones, nitro aromatics, nitro aliphatics, water insoluble esters, ethers and hydrocyclic compounds relatively insoluble in water.

The synthesis reaction is advantageously effected with a fluidized mass of synthesis catalyst in solid particle form, although it is contemplated that the catalyst may be used in the form of a stationary bed, a moving bed, or a suspension of particles entrained in the reactants. While specific temperatures and pressures have been referred to, it is contemplated that these will vary depending on what catalyst is employed and what particular products are desired. For example, the synthesis temperatures may range from 250–700° F. and reaction pressure may vary from atmospheric to about 1000 pounds per square inch.

Obviously, many modifications and variations of the invention, as hereinbefore set forth, may be made without departing from the spirit and scope thereof and, therefore, only such limitations should be imposed as are indicated in the appended claim.

We claim:

In the catalytic conversion of carbon monoxide and hydrogen into a product mixture of water, hydrocarbons and alcohols having from one to about twenty carbon atoms per molecule at temperature and pressure conditions effective for said conversion, the improvement which comprises separating said product mixture at atmospheric conditions into a gas phase, a hydrocarbon phase containing the major portion of the alcohols having more than 5 carbon atoms per molecule and a substantial portion of the $C_4$ and $C_5$ alcohols and an aqueous phase containing the remainder of the alcohols produced in said conversion, subjecting said aqueous phase to distillation whereby there is formed a distillate consisting of an aqueous azeotropic mixture of alcohols, extracting said hydrocarbon phase with a $C_2$—$C_3$ alcohol fraction of this aqueous azeotropic mixture whereby there is formed a hydrocarbon fraction substantially free of oxygenates, subjecting the remainder of said aqueous azeotropic mixture to countercurrent extraction with a portion of said oxygenate-free hydrocarbon fraction at a temperature of about 175 to 350° F. and a pressure of about 100 to 300 pounds per square inch whereby there is formed an aqueous phase of reduced alcohol content and a hydrocarbon extract phase containing alcohols and separating said alcohols from said hydrocarbon extract phase.

HOWARD V. HESS.
GEORGE B. ARNOLD.

REFERENCES CITED

The following references are of record in the file of this patent:

UNITED STATES PATENTS

| Number | Name | Date |
|---|---|---|
| 1,524,192 | Mann, Jr. | Jan. 27, 1925 |
| 2,083,125 | Scheuble | June 8, 1937 |
| 2,274,750 | Soenksen et al. | Mar. 3, 1942 |
| 2,417,164 | Huber, Jr. | Mar. 11, 1947 |
| 2,476,788 | White | July 19, 1949 |

OTHER REFERENCES

Fischer, Conversion of Coal Into Oils, pub. by Ernest Benn, Ltd., London (1925), 241–6.

Navel Tech. Mission, pages 1, 73, 84, 85, 90 (1945).